United States Patent
Soloff

(10) Patent No.: US 7,154,916 B2
(45) Date of Patent: Dec. 26, 2006

(54) METHOD FOR REAL-TIME INSERTION OF AUXILIARY DATA PACKETS INTO DSS BITSTREAM IN THE PRESENCE OF ONE OR MORE SERVICE CHANNELS

(75) Inventor: Steven M. Soloff, Tamarac, FL (US)

(73) Assignee: The DirecTV Group, Inc., El Segundo, CA (US)

( * ) Notice: Subject to any disclaimer, the term of this patent is extended or adjusted under 35 U.S.C. 154(b) by 970 days.

(21) Appl. No.: 10/007,909

(22) Filed: Nov. 7, 2001

(65) Prior Publication Data

US 2003/0021166 A1 Jan. 30, 2003

Related U.S. Application Data

(60) Provisional application No. 60/308,160, filed on Jul. 26, 2001.

(51) Int. Cl.
*H04J 3/12* (2006.01)
*H04N 7/20* (2006.01)

(52) U.S. Cl. ......................... 370/528; 725/63
(58) Field of Classification Search ................ 370/252, 370/528, 538, 490, 487, 486, 537, 468, 524; 270/252; 375/240.26; 348/512, 473; 725/63
See application file for complete search history.

(56) References Cited

U.S. PATENT DOCUMENTS

| 4,581,746 A | * | 4/1986 | Arnold | ......................... 370/468 |
| 5,157,491 A | | 10/1992 | Kassatly | |
| 5,163,046 A | * | 11/1992 | Hahne et al. | ................ 370/237 |
| 5,410,344 A | | 4/1995 | Graves et al. | |
| 5,461,619 A | * | 10/1995 | Citta et al. | ................... 370/468 |
| 5,557,724 A | | 9/1996 | Sampat et al. | |

(Continued)

OTHER PUBLICATIONS

Yahoo! Press Release, "Yahoo! Launches Yahoo! En Espanol, Spanish Language Web Guide Features Spanish Programming and Resources for the Global Spanish Speaking Community", Jun. 8, 1998.

*Primary Examiner*—Ricky Q. Ngo
*Assistant Examiner*—Warner Wong
(74) *Attorney, Agent, or Firm*—Georgann S. Grunebach

(57) ABSTRACT

An apparatus and method that allows for the automatic, real-time insertion of auxiliary data packets into a single or multi-channel bitstream in a satellite television broadcast system. Computer readable instructions stored in a storage medium provides iterative steps necessary to detect the presence of a data packet within the data bitstream, establish a bitstream data packet counter for storing values representing the number of the data packets encountered in the data bitstream, set the bitstream data packet counter to an initial value, increment the bitstream data packet counter, determine which channel bitstream the detected data packet is associated with and identify the channel as an operative channel bitstream, establish an operative channel data packet counter for the operative channel bitstream for storing values representing the number of the data packets encountered in the operative channel bitstream, set the operative channel data packet counter to an initial value, increment the operative channel data packet counter, determine a channel bit rate for the operative channel bitstream, determine a data packet spacing value for the operative channel bitstream, and if the value of the operative channel data packet counter is a multiple of the data packet spacing value for the operative channel bitstream then insert the data packet within the operative channel bitstream.

9 Claims, 4 Drawing Sheets

U.S. PATENT DOCUMENTS

| | | |
|---|---|---|
| 5,563,648 A | 10/1996 | Menand et al. |
| 5,594,935 A | 1/1997 | Reber et al. |
| 5,668,591 A | 9/1997 | Shintani |
| 5,714,997 A | 2/1998 | Anderson |
| 5,724,091 A | 3/1998 | Freeman et al. |
| 5,819,034 A | 10/1998 | Joseph et al. |
| 5,857,190 A | 1/1999 | Brown |
| 5,861,881 A | 1/1999 | Freeman et al. |
| 5,889,954 A | 3/1999 | Gessel et al. |
| 5,933,827 A | 8/1999 | Cole et al. |
| 5,970,071 A * | 10/1999 | Le Garrec .................. 370/528 |
| 6,052,554 A | 4/2000 | Hendricks et al. |
| 6,067,107 A | 5/2000 | Travaille et al. |
| 6,097,441 A | 8/2000 | Allport |
| 6,097,739 A * | 8/2000 | Yamashita .................. 370/528 |
| 6,101,536 A | 8/2000 | Kotani et al. |
| 6,268,849 B1 | 7/2001 | Boyer et al. |
| 6,308,081 B1 * | 10/2001 | Kolmonen .................. 455/522 |
| 6,393,427 B1 | 5/2002 | Vu et al. |
| 6,466,972 B1 | 10/2002 | Paul et al. |
| 6,470,498 B1 | 10/2002 | Reber et al. |
| 6,490,356 B1 | 12/2002 | Beuque |
| 6,499,027 B1 | 12/2002 | Weinberger |
| 6,504,990 B1 * | 1/2003 | Abecassis |
| 6,606,746 B1 | 8/2003 | Zdepski et al. |
| 6,675,385 B1 | 1/2004 | Wang |
| 6,680,746 B1 | 1/2004 | Kawai et al. |
| 6,728,705 B1 | 4/2004 | Licon et al. |
| 6,782,006 B1 * | 8/2004 | Tanaka et al. ............... 370/468 |
| 6,788,710 B1 * | 9/2004 | Knutson et al. ............ 370/535 |
| 6,792,007 B1 | 9/2004 | Hamada et al. |
| 6,801,936 B1 | 10/2004 | Diwan |
| 6,816,201 B1 | 11/2004 | Fang et al. |
| 2001/0019360 A1 | 9/2001 | Tanaka et al. |
| 2001/0036198 A1* | 11/2001 | Arsenault et al. ........... 370/477 |
| 2002/0069411 A1 | 6/2002 | Rainville et al. |
| 2002/0069416 A1 | 6/2002 | Stiles |
| 2002/0188943 A1 | 12/2002 | Freeman et al. |
| 2003/0105845 A1 | 6/2003 | Leenmakers |
| 2003/0214982 A1* | 11/2003 | Lorek et al. ................ 370/537 |
| 2004/0228315 A1* | 11/2004 | Malkamaki ................ 370/342 |

* cited by examiner

METHOD FOR REAL-TIME INSERTION OF AUXILIARY DATA PACKETS INTO DSS BITSTREAM IN THE PRESENCE OF ONE OR MORE SERVICE CHANNELS

This application claims the priority and benefit of the U.S. Provisional Application Ser. No. 60/308,160 filed on Jul. 26, 2001, for "ON THE REAL-TIME INSERTION OF AUXILIARY DATA PACKETS INTO A DSS BITSTREAM IN THE PRESENCE OF MULTIPLE SERVICE CHANNELS" Inventor: Steven M. Soloff, the entire contents of which are incorporated herein by this reference.

BACKGROUND OF THE INVENTION

1. Field of the Invention

The invention generally relates to satellite television network broadcasts and more specifically to a method and system of inserting auxiliary data packets into a single or multi-channel DSS bitstream in a real-time manner.

2. Description of the Prior Art

In traditional television broadcast systems, it is often desirable to restrict the number of accessible television channels to only those subscribers who actually pay for the particular channels. The same restrictions apply to interactive satellite television broadcasts. If, for example, a subscriber does not have access to HBO, or CNN, it is desirable to insure that the user cannot access these channels and to inform the user that although he or she does not presently have access to these service channels, they can order the channels by following ordering instructions. These security measures and the ordering information are presented to the user via traditional satellite broadcasts.

The security measures and additional service channel information are broadcast in the form of security or auxiliary data packets and must be inserted into the traditional satellite uplink broadcasts via what is know in the art as head-end platforms. The goal is to prevent the user from viewing channels that he or she has not paid to see and to allow the user to order the channels if he or she so desires. The user should be presented with a television screen full of content, without "dead time" (i.e. a blank screen), whether it be actual programming content, or advertisements or instructions prompting the user to subscribe to additional service channels.

The data packets are placed in auxiliary data packet placeholders, which are inserted at the appropriate rate into an application stream to be included in a traditional satellite uplink subsystem. However, the insertion of these security data packets or data packet placeholders at the appropriate rate is not an easy task. The computer operator must insert enough data packets in order to insure that the user is not viewing a blank television screen. The operator is also limited by bandwidth constraints since the data packets are identical and multiple insertions are merely a waste of valuable bandwidth. The rate of insertion of these data packets is therefore critical. If the insertion rate is too slow and not enough data packets are present in the satellite broadcast, then the end user, when he or she tunes to that specific channel, may be looking at a blank screen, devoid of any information since it is the information contained in the data packets that the user sees first. If too many data packets are inserted, it is a waste of the bandwidth of the transmission because each data packet contains essentially the identical information.

Presently, systems exist that have the capability to insert security or auxiliary data packets or data packet placeholders into a stream of data comprised of one service channel that will be part of the uplink system of a traditional satellite broadcast. In a stream comprised of a single service channel, this is not difficult since the operator need only be aware of the bit rate for the service channel and the number of auxiliary packets to insert per second, to derive the insertion rate. Because the bit rate of a multiplexed data file having a single service channel must necessarily equal the bit rate of the multiplexed file itself, the parameters are known and the real time insertion of data packets can be performed.

However, the bit rate of the data stream is rarely a constant. This rate may often change as will the number of service channels within the bitstream. Therefore, a service operator cannot set the data packet insertion rate and expect this rate to apply for all data streams.

Problems also arise when software programmers attempt to insert these data packets into a multiplexed data file comprised of more than one service channel. In this scenario, the aggregate bit rate of the entire data stream is known, but the bit rate of each individual service channel is unknown. The service operator cannot rely on his knowledge of the aggregate bit rate for the entire data stream, since each service channel bitstream within the total datastream has its own bit rate.

In the prior art, the only way the operator would be able to discern the number of packets that would correspond to each service channel if he were to be provided with this additional information. For example, if the operator knew that 10% of all data packets would go into service channel 1 and 25% would go into service channel 2, then the data packet allocation could be performed. But this would require the operator to be aware of this additional information. The goal is to achieve the result of proper data packet or data packet placeholder insertion without the need for any additional information. Therefore, the prior art methods cannot apply to multiple channel data streams.

It could be argued that the broadcast subsystem could be reconfigured to accept not only the bit rate for the entire multiplexed file, but also the bit rates of the individual service channels. This approach has a number of drawbacks. In particular, it leaves it up to a human operator to ensure that not only the individual bit rates are correct, but that they also correctly add up to the aggregate. The chance for human error is great and increases based upon the number of service channels, each having its own unique bit rate, within the entire data stream. This approach does not lend itself to automation, and in the fast-paced world of satellite broadcasts, automation is critical.

Accordingly, what is needed in the art is a system and method designed to automatically insert auxiliary head-end data packet placeholders in single or multiple channel data stream regardless of the number of service channels comprising the data stream, for the later insertion of data packets in conventional satellite television broadcasts.

It is, therefore, to the effective resolution of the aforementioned problems and shortcomings of the prior art that the present invention is directed.

SUMMARY OF THE INVENTION

The present invention is a method for inserting data packets or data packet placeholders in a real-time manner, within a single or multiple channel bitstream in a satellite television uplink subsystem.

Generally, the invention is a method for real time insertion of auxiliary data packets into a single or multiple service channel satellite television broadcast comprising the steps of reading a data bitstream having a data bitstream aggregate bit rate, counting data packets present within the data bitstream, determining which channel the data packets are associated with and identifying the channel as an operative channel bitstream, counting the data packets associated with the operative channel bitstream, determining a channel bit rate for the operative channel bitstream, determining a duration of time that must elapse before the data packet is inserted in the channel bitstream, and inserting said data packet within said operative channel bitstream after said duration of time has elapsed.

In the preferred embodiment of the invention, a unique set of computer readable instructions is provided, which are stored in a storage medium to provide the necessary steps of detecting a data bitstream and while the bitstream is being detected, the computer instructions iteratively perform the following steps: detecting a data bitstream having a data bitstream aggregate bit rate, the data bitstream comprising one or more data packets; establishing a bitstream data packet counter for storing values representing a number of the data packets encountered in the data bitstream; while said bitstream is being detected, iteratively performing the steps of encountering the data packet within the data bitstream; incrementing the bitstream data packet counter; determining which channel bitstream the detected data packet is associated with and identifying said channel as an operative channel bitstream; if not already established, establishing an operative channel data packet counter for the operative channel bitstream for storing values representing the number of data packets encountered in the operative channel bitstream; incrementing the operative channel data packet counter; determining a channel bit rate for the operative channel bitstream; determining a data packet spacing value for the operative channel bitstream; and if the value of the operative channel data packet counter is a multiple of the data packet spacing value for the operative channel bitstream then inserting the data packet within the operative channel bitstream.

Determining a channel bit rate for the operative channel bitstream preferably comprises the steps of obtaining the ratio between the value representing the number of data packets encountered in the data bitstream and the value representing the number of data packets encountered in the operative channel bitstream, and multiplying the ratio by the data bitstream aggregate bit rate.

It is to be understood that both the foregoing general description and the following detailed description are explanatory and are not restrictive of the invention as claimed. The accompanying drawings, which are incorporated in and constitute part of the specification, illustrate the preferred embodiment of the present invention and together with the general description, serve to explain principles of the present invention.

DESCRIPTION OF THE PREFERRED EMBODIMENTS

The present invention is a method which performs a series of steps designed to automatically insert auxiliary data packet placeholders in a single or multi-channel data stream as part of a satellite broadcast uplink subsystem. No additional parameters are needed, other than the aggregate datastream bit rate and the data packet insertion rate, each specified by the operator.

Figure 1:
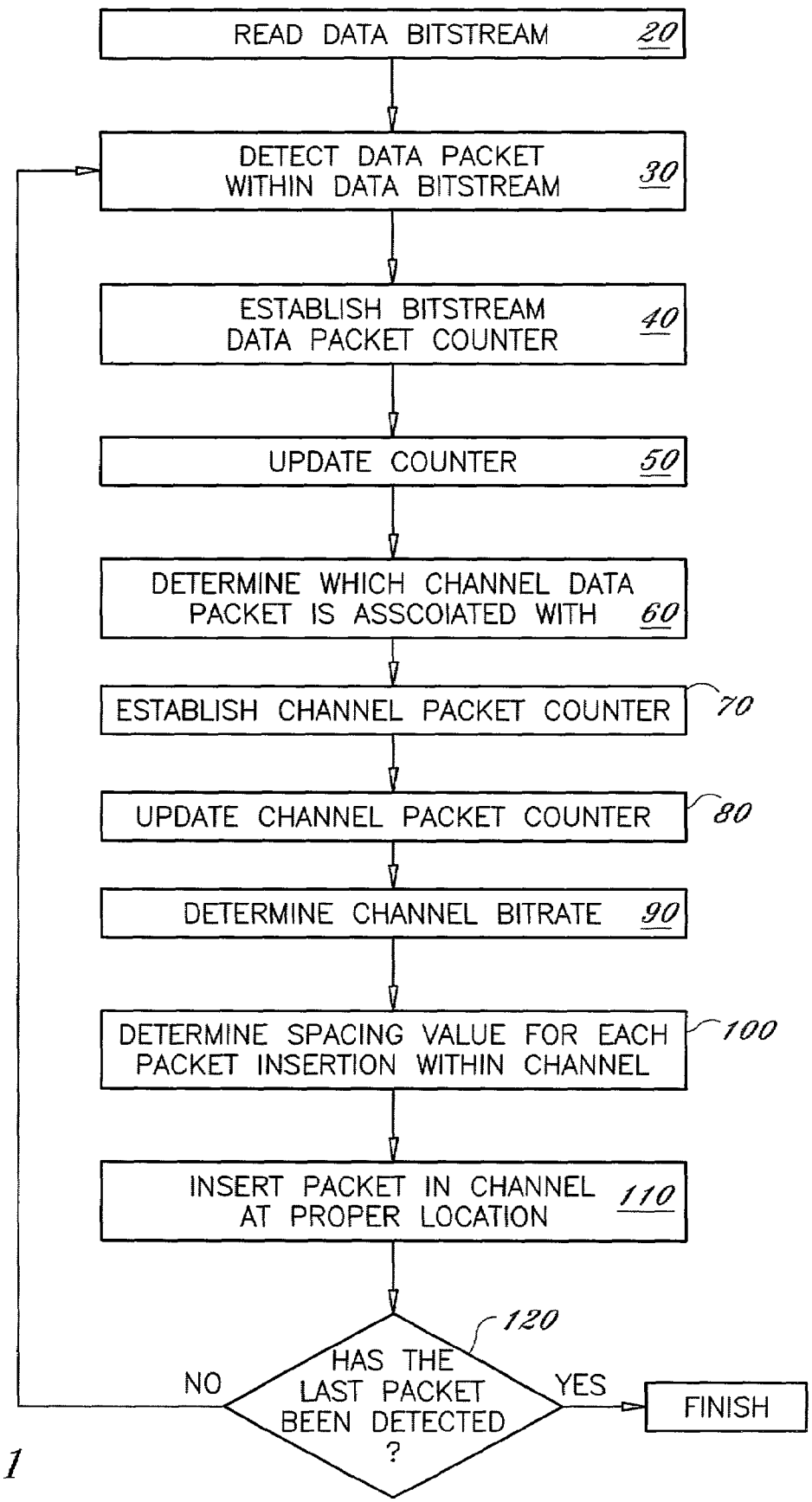
FIG. 1 illustrates a flow diagram showing the steps performed by the present invention.

Referring to FIG. 1, a flowchart is shown which illustrates the steps performed by the present invention 10. For clarification, the term "data packet" or "packet" may also refer to a data packet placeholder. It is within the scope of the invention to provide a method for inserting placeholders that will eventually hold the actual auxiliary data packets. The actual data packets may be inserted "upstream" at any later time in the satellite broadcast uplink subsystem.

The pseudo code required to perform the iterative steps illustrated in FIG. 1 are as follows:

while bitstream is playing
    read next packet $P = P + 1$ s = extract SCID value from packet $P_s = P_s + 1$ $b_s = b*(P_s/P)$ $\Delta P_s = b_s/(8*130*A_s)$ if $P_s$ mod $\Delta P_s = 0$ then
        Insert an auxiliary data packet on SCID s
    end if
end while where
    $SCID_s$ = a specific service channel (s) within the entire data bitstream
    P = total number of data packets encountered in data bitstream
    $P_s$ = total number of data packets encountered for SCID s
    b = aggregate bit rate for data bitstream (known by operator, in bits/second)
    $b_s$ = bit rate for $SCID_s$ (bits/second)
    $A_s$ = data packet insertion rate for $SCID_s$ (known by operator, in packets/second)
    $\Delta P_s$ = data packet spacing for $SCID_s$ Referring now to FIG. 1, the first step of the process is to detect a data bitstream, step 20, and to count each data packet within a given data stream. Computer software instructions detect the presence of a data packet within the data stream, via step 30. Upon detection of the data packet, a counter is established, step 40, and advanced, step 50, thereby incrementing the counter and storing a current value representing the number of data packets encountered in said data bitstream. The line of code accomplishing this step is $P = P + 1$.

Once a packet has been detected, it must then be determined which service channel the data packet belongs to. This is accomplished via step 60, by determining the identity, s, of the detected packet. Each data packet contains, usually in its header, the identity of the SCID (service channel) to which it belongs. Because the packets are serialized, i.e. they each are presented in the data bitstream one at a time, each packet is read and its channel identified. The variable s represents the SCID or channel corresponding to the detected data packet. This channel is identified as the operative channel. A separate counter is established, step 70 and incremented, via step 80. This keeps track of the number of packets for each operative channel. This is accomplished via step according to line 3 of the pseudocode above, $P_s=P_s+1$.

Because the aggregate bit rate for the entire data bitstream is known to the user, as well as the ratio of individual packets for a given channel to the number of overall packets for the entire bitstream, it becomes a straightforward calculation to obtain the bit rate for each individual channel. This is accomplished at step 90, where the bit rate for channel s is determined. Determining the bit rate for service channel s is accomplished by multiplying the aggregate bit rate for the entire datastream $b_s$ (a known quantity) by the ratio of data packets for channel s and total data packets for the entire bitstream, $P_s/P$. The equation for this is shown in the pseudocode above, $b_s=b * (P_s/P)$.

The next step in the process is to determine the spacing between packet insertions, for the individual channel, s, i.e. how many data bits must go by before a data packet is to be inserted into the bitstream. This is calculated from several known parameters, namely the bit rate of channel s (calculated above), the data packet insertion rate, as specified by the user (for example, 10 packets/second) and the number of bits in a typical packet. For example, there may be 130 Bytes per data packet. At 8 bits per Byte, there would be 1,040 bits per data packet. From this data, the packet spacing for a given channel s can be determined, via step 100, according to $\Delta P_s=b_s/(8*130*A_s)$.

Once it has been determined how many data bits must go by before a data packet is to be inserted into the bitsream, it is a simple calculation to determine exactly when the data packet insertion must occur. The pseudocode, if $P_s \bmod \Delta P_s=0$ then insert an auxiliary data packet on SCID s end if determines if the current value of the operative channel$_s$ data packet counter ($P_s$) is a multiple of the data packet spacing value for the operative channel bitstream ($\Delta P_s$). The step, $P_s \bmod \Delta P_s=0$, is a modulo division instruction. If the result of the modulo division instructions results in a "0" remainder, then there is an insertion of the data packet within the operative channel bitstream (s), via step 110.

It must then be determined if any more data packets are in the bitstream, via step 120. If more data packets are detected in the data bitstream, the iterative process is repeated, beginning with the detecting of data packets within the stream, step 30 through the determination if there are any additional packets in the data bitstream, step 120. The entire process is repeated until no more data packets have been detected. It is evident from the inventive process that the bit rate of each service channel $b_s$ and the spacing between each data packet insertion $\Delta P_s$ are mean quantities that change over time with each iteration.

Figure 2:
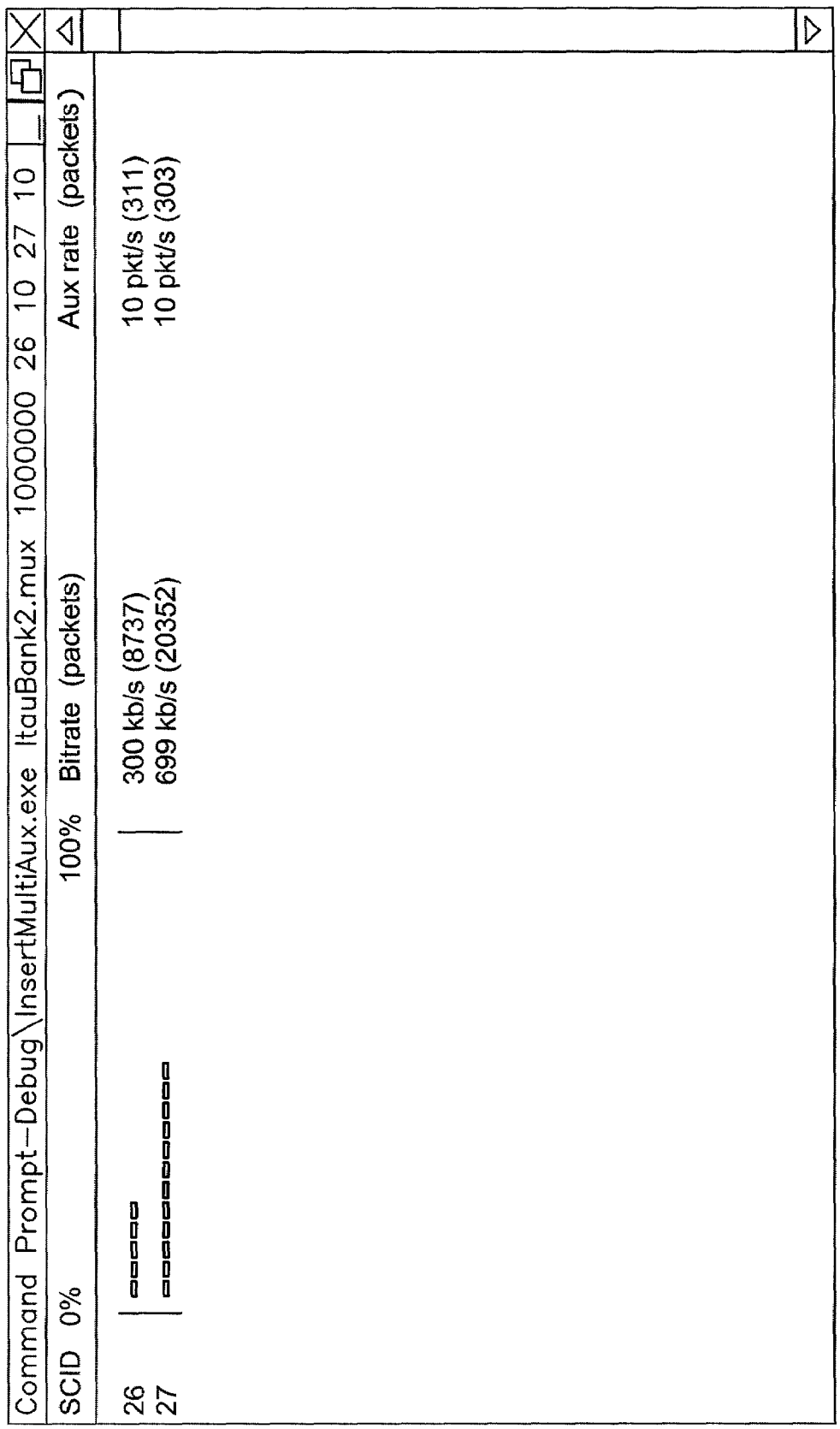
FIG. 2 illustrates test results using the present invention showing a plot of the bit rate for an individual service channel versus time.

Referring to FIG. 2, a computer screen is shown illustrating the testing of a data bitstream having two separate channels, identified as SCID 26 and SCID 27, utilizing the present invention. In the test screen of FIG. 2, each service channel is identified, as well as its corresponding bit rate (number of packets for each SCID) and auxiliary packet insertion rate.

The application illustrated in FIG. 2 was performed on a computer with an Intel Pentium III 550 MHz processor, having 128 MB of RAM and running Windows 2000. The application was implemented in C++. It is within the scope of the present invention to implement the method and algorithm in any compatible computer language together with compatible hardware.

FIG. 2 shows a snapshot in time of the incorporation of the present invention in a multiple channel data stream. The test demonstration application illustrated here reads a single mux file, containing two service channel streams, from a data storage medium, such as a disk, and continuously processes it in much the same manner as a broadcast system would process an incoming data bitstream.

Figure 3:
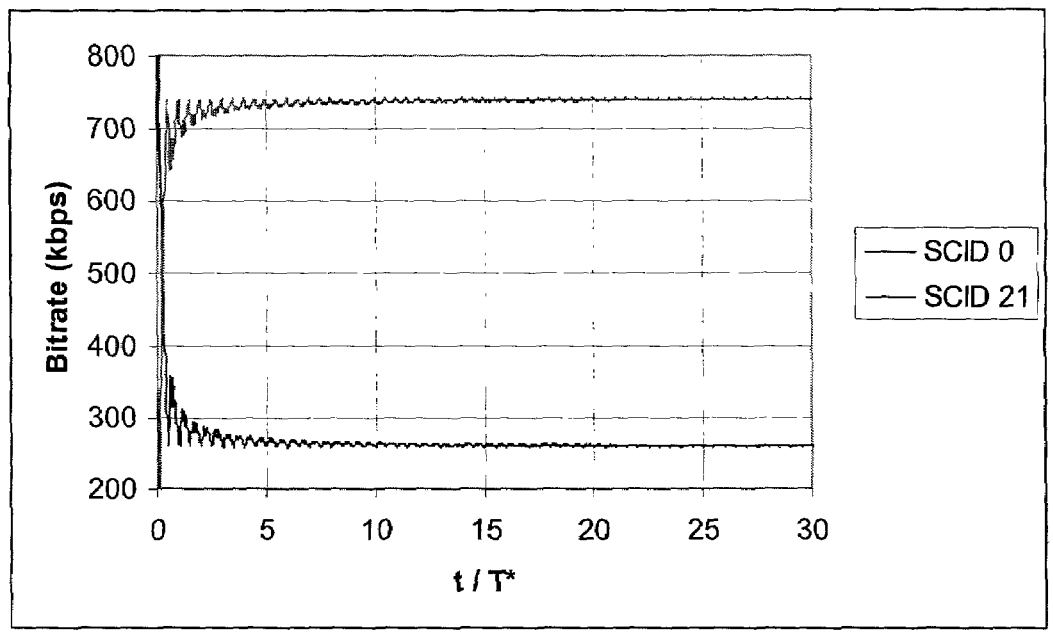
FIG. 3 illustrates test results using the present invention showing a plot of the auxiliary data packet insertion rate for an individual service channel versus time.

FIG. 3, shows a test case using the present invention where an application contained one non-zero SCID (SCID 21) and SCID 0. The mux file contained 1924 packets on SCID 0 and 5504 packets on SCID 21. The aggregate bit rate was set to 1 Mbps and an auxiliary insertion rate of 10 packets/second was chosen for SCID 21. FIG. 3 represents a plot of the bit rate for each channel (SCID) versus time. Time has been normalized by the duration of the mux file, called a carousel, and represented by T*. The bit rate for SCID 0 appears to be approximately 725 kbits per second while the bit rate for SCID appears to be approximately 275 kbits per second. The bit rate for each SCID reaches a steady-state value between approximately 10 and 20 carousels, or 0.5 to 1 second, a relatively short time period.

Figure 4:
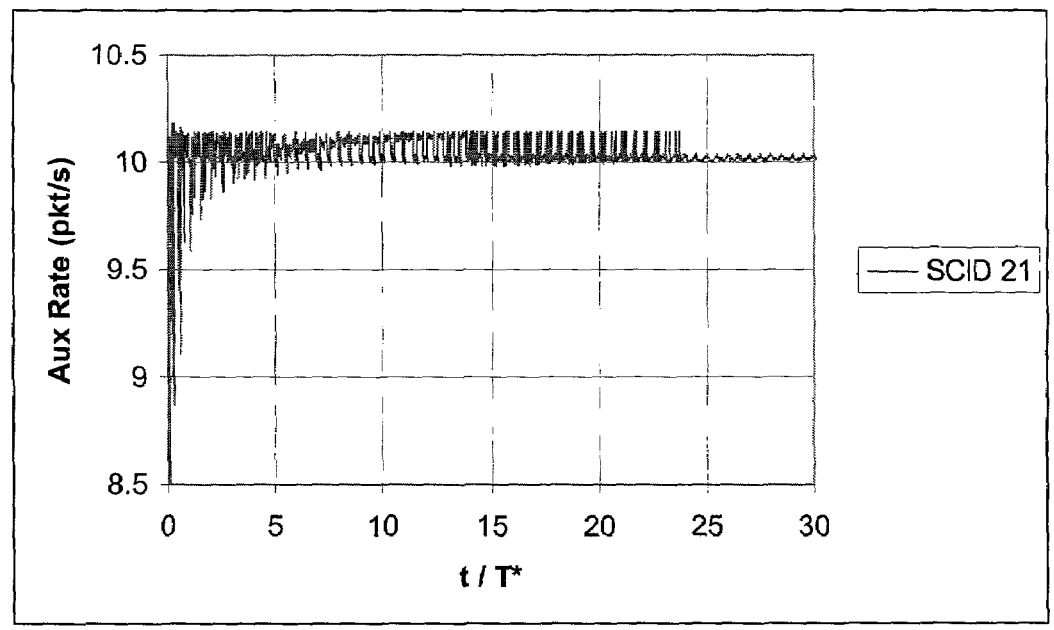
FIG. 4 illustrates test results using the present invention showing a plot of the bit rates for two individual service channels versus time.

FIG. 4 plots the auxiliary data packet insertion rate of SCID 21 versus normalized time, using the algorithm of the present invention. Floating-point values were used for illustrative purposes. In FIG. 4, it can be seen that approximately 24 carousels were required to obtain a true steady-state value. However, due to integer truncation, five (5) carousels were sufficient for ten (10) data packets to be inserted per second, with virtually no traversal into the 9-packet per second range.

Figure 5:
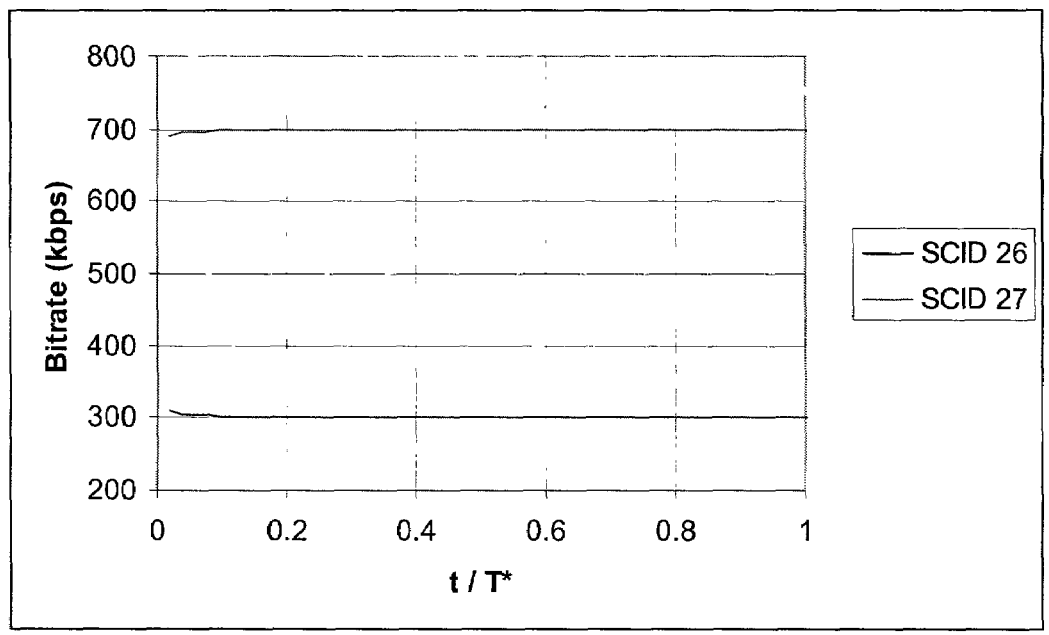
FIG. 5 illustrates test results using the present invention showing a plot of the auxiliary data packet insertion rate for two individual service channels versus time.

FIG. 5 illustrates a second test case for an application containing two SCIDs, SCID 26 and SCID 27, utilizing the present invention. The mux file contained 1573 packets on SCID 26 and 3664 packets on SCID 27. The aggregate bit rate was set as 1 Mbps and an auxiliary packet insertion rate was set at 10 packets per second for each SCID. FIG. 5 represents a plot of the bit rate for each SCID versus time.

As seen in FIG. 5, the bit rate for each SCID reaches a steady state almost immediately. There is virtually no deviation in bit rate after 0.02 carousels, certainly after 1 carousel, with SCID 26 at approximately 700 kbps and SCID 27 at 300 kbps.

Figure 6:
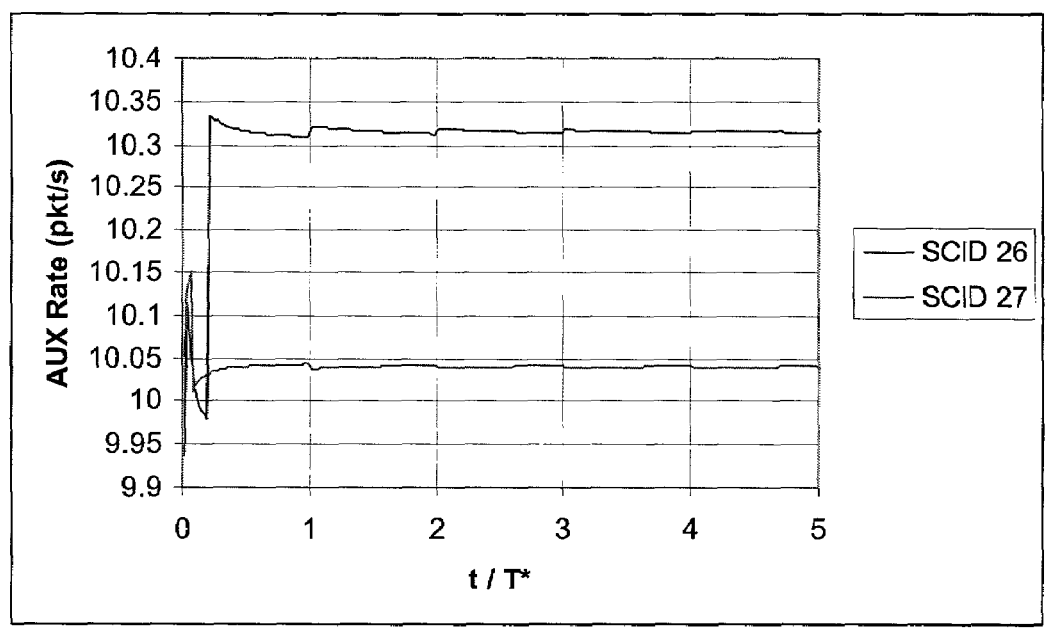
FIG. 6 is a computer screen showing the analysis of two independent service channels using the present invention.

FIG. 6 is a plot of the auxiliary data packet insertion rate for each SCID versus normalized time. Again, only one carousel is required to obtain a true steady-state value.

The method of the present invention allows the automated and real-time insertion of data packet placeholders or the data packets themselves in the head-end portion of a satellite television broadcast uplink subsystem. The pseudocode indicated above is not the only method of performing the steps outlined in the claims, and comparable variations would also provide the same results. The implementation of the algorithm of the present invention provides an actual function, i.e. the automated insertion of data packets into a data bitstream, regardless of the number of individual service channels and without prior knowledge of the service channel bit rates.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for real time insertion of auxiliary data packets into a single or multiple service channel broadcast comprising the steps of:
   reading a data bitstream having a data bitstream aggregate bit rate;
   detecting data packets with the data bitstream;
   counting data packets present within said data bitstream;
   reading a header associated with each data packet in order to determine a channel for each detected data packet;
   identifying at least one operative channel for the detected data packets;
   counting a number of data packets associated with each operative channel;
   determining a channel bit rate for each operative channel bitstream by multiplying said aggregate bit rate by a ratio of the number of data packets for each respective operative channel and a total number of data packets for the data bitstream;
   determining a data packet insertion period for the insertion of an auxiliary data packet in a respective operative channel bitstream, where the insertion period is the number of data bits that transmit between the insertion of said auxiliary data packets; and
   inserting said auxiliary data packet within each respective operative channel bitstream based on said packet insertion period and channel bit rate.

2. A method far real time insertion of auxiliary data packets into a single or multiple service channel satellite television broadcast comprising the steps of:
   detecting a data bitstream having a data bitstream aggregate bit rate;
   establishing a bitstream data packet counter for storing values representing a number of data packets encountered in said data bitstream;
   while said bitstream is being detected, iteratively performing the following steps (a)–(h):
   (a) detecting said data packets within said data bitstream;
   (b) incrementing said bitstream data packet counter for each data packet encountered;
   (c) reading a header associated with each data packet in order to determine a channel for each detected data packet and identifying at least one operative channel for the detected data packets;
   (d) if not already established, establishing an operative channel data packet counter for each operative channel bitstream in order to count a number of said data packets detected in each respective operative channel bitstream;
   (e) incrementing each operative channel data packet counter;
   (f) determining a channel bit rate for each operative channel bitstream;
   (g) determining a data packet insertion period for each respective operative channel bitstream, where the insertion period is the number of data bits that transmit between the insertion of said auxiliary data packets; and
   (h) if the value of any respective operative channel data packet counter is a multiple of said data packet insertion period for said respective operative channel bitstream then inserting an auxiliary data packet within said respective operative channel bitstream.

3. The method of claim 2 wherein said step of determining a channel bit rate for each respective operative channel bitstream comprises the steps of multiplying said aggregate bit rate by a ratio of the number of data packets for each respective operative channel and a total number of data packets for the data bitstream.

4. The method of claim 1 wherein said data bitstream is comprised of video and/or audio television signals.

5. The method of claim 1 wherein said auxiliary data packets function as data packet placeholders.

6. A computer program stored in a computer readable medium, embodying instructions to perform real time insertion of auxiliary data packets into a single or multiple service channel satellite television broadcast, the instructions comprising the steps of:
   detecting a data bitstream having a data bitstream aggregate bit rate;
   establishing a bitstream data packet counter for storing values representing a number of data packets encountered in said data bitstream;
   while said bitstream is being detected, iteratively performing the following steps (a)–(h):
   (a) detecting said data packets within said data bitstream;
   (b) incrementing said bitstream data packet counter for each data packet encountered;
   (c) reading a header associated with each data packet in order to determine a channel for each detected data packet and identifying at least one operative channel for the detected data packets;
   (d) if not already established establishing an operative channel data packet counter for each operative channel bitstream in order to count a number of said data packets detected in each respective operative channel bitstream;
   (e) incrementing each operative channel data packet counter;
   (f) determining a channel bit rate for each operative channel bitstream;
   (g) determining a data packet insertion period for each respective operative channel bitstream, where the insertion period is the number of data bits that transmit between the insertion of said auxiliary data packets; and
   (h) if the value of any respective operative channel data packet counter is a multiple of said data packet insertion period for said respective operative channel bitstream then inserting said an auxiliary data packet within said respective operative channel bitstream.

7. The computer program of claim 6 wherein said step of determining a channel bit rate for each respective operative channel bitstream comprises the steps of multiplying said aggregate bit rate by a ratio of the number of data packets for each respective operative channel and a total number of data packets for the data bitstream.

8. The computer program of claim 6 wherein said data bitstream is comprised of video and/or audio television signals.

9. The computer program of claim 6 wherein said auxiliary data packets function as data packet placeholders.

* * * * *